United States Patent [19]

Honeycutt

[11] 3,827,446
[45] Aug. 6, 1974

[54] FRUIT AND VEGETABLE HARVESTING DEVICE

[76] Inventor: Bass Honeycutt, Rt. 5, Clinton, N.C. 28328

[22] Filed: Dec. 1, 1972

[21] Appl. No.: 311,121

[52] U.S. Cl............... 134/63, 134/115 R, 134/133, 214/83.1
[51] Int. Cl............................................. B08b 3/02
[58] Field of Search.......... 134/63, 115 R, 127, 131, 134/133; 214/83.1

[56] References Cited
UNITED STATES PATENTS

| | | | |
|---|---|---|---|
| 1,504,846 | 8/1924 | Tarkington | 214/83.1 |
| 2,647,525 | 8/1953 | Duda et al. | 134/63 |
| 2,782,943 | 2/1957 | Jones et al. | 214/83.1 |

Primary Examiner—Robert L. Bleutge
Attorney, Agent, or Firm—Mills and Coats

[57] ABSTRACT

A fruit and vegetable harvesting device including a mobile frame structure adapted to be towed by a tractor having a power takeoff associated therewith. The mobile frame structure includes a plurality of laterally spaced and transversely aligned picking stations disposed on the forward portion thereof with each picking station including a seat structure supported in close proximity to the ground such that an individual worker seated thereon may pick the randomly disposed fruit or vegetables growing therebeneath as the mobile frame structure traverses the field. The mobile frame structure further includes a conveyor system for conveying the individual picked fruit or vegetables from the various picking stations to a unitized washing and grading facility disposed on the mobile frame structure.

11 Claims, 4 Drawing Figures

FRUIT AND VEGETABLE HARVESTING DEVICE

The present invention relates to harvesting, and more particularly to harvesting devices for small fruits and vegetables such as cucumbers and sweet peppers.

In the past, there has been considerable development work in the area of small fruit and vegetable harvesting. For the most part, fruit and vegetable harverters have been designed to pick fruit or vegetables from the crop vine and to convey them into an accumulating bin or the like. After the accumulating bin has been filled, the fruit or vegetables contained therein are transported to a grading and washing site where the fruit or vegetables are washed and graded according to size and then placed in crates or baskets according to the particular grade designated. While these types of harvesters of the prior art have generally performed the harvesting operation satisfactory, they, nevertheless, do inherently have the disadvantages resulting from being required to transport the bulk load to a cleaning and grading site before harvesting can be continued. It naturally follows that the time spent in transporting and transferring between the field and the cleaning, grading and packaging site requires substantial time and involves delay in continuing with the harvesting operation, which can especially be detrimental when the fruit or vegetable being harvested reaches prime maturity.

After much research and study into the above mentioned problems, the present small fruit and vegetable harvesting device has been devised and particularly provides a harvesting unit that includes facilities thereon for not only picking the small fruit or vegetable involved, but also for cleaning and grading the fruit or vegetable as the harvesting device traverses the field. More particularly, the fruit and vegetable harvesting device of the present invention basically comprises a mobile frame structure or trailer that is adapted to be pulled behind a tractor and includes a plurality of laterally spaced picking stations transversely disposed about the forward portion of the frame structure and spaced in close proximity to the ground such that the picking stations may support individual workers thereon who manually pick the fruit or vegetables as the harvesting device is towed through the field. Also, provided is a transverse consolidating conveyor system which is placed in close proximity to the picking stations and which functions to transfer the individual fruit or vegetable to a central consolidating area on the mobile frame. From the central consolidating area, the consolidated fruit or vegetables are then conveyed into a unitized cleaning facility and grading station where the fruit and vegetables are cleaned, graded according to size and packaged, all during the actual harvesting operation.

It is, therefore, an object of the present invention to provide a fruit and vegetable crop harvesting device that is not only designed to harvest the fruit or vegetable involved, but also provides as a part of the same harvesting unit a facility for cleaning and grading the picked fruit or vegetables.

A further object of the present invention is to provide a small fruit and vegetable harvesting device for picking, cleaning and grading the harvested fruit or vegetables, and to provide a systematic conveying system which allows the cleaning and grading operation to be carried on simultaneously with the actual picking operation.

Still a further object of the present invention resides in the provision of a small fruit and vegetable harvesting device which comprises in the harvesting unit itself a unitized cleaning and grading facility which is adapted to receive small fruit or vegetables via a conveyor system from a plurality of picking stations spaced forwardly on the harvesting device, whereby the fruits or vegetables, depending on the crop involved, are continuously cleaned and graded during the actual harvesting operation and are placed in containers on the basic harvesting unit.

It is also a further object of the present invention to provide a fruit or vegetable cleaning system as a part of a basic harvesting unit, and to provide the cleaning system with means for dispensing a cleaning solution under pressure to fruit or vegetables passing thereunder during the harvesting operation.

A more particular object of the present invention resides in the provision of a drive system for driving a pump from the power take-off of a tractor in order to supply a cleaning solutation under pressure to fruit or vegetables passing through a cleaning stall on the basic harvesting unit.

Other objects and advantages of the present invention will become apparent from a study of the following specification.

IN THE DRAWINGS

Figure 1:
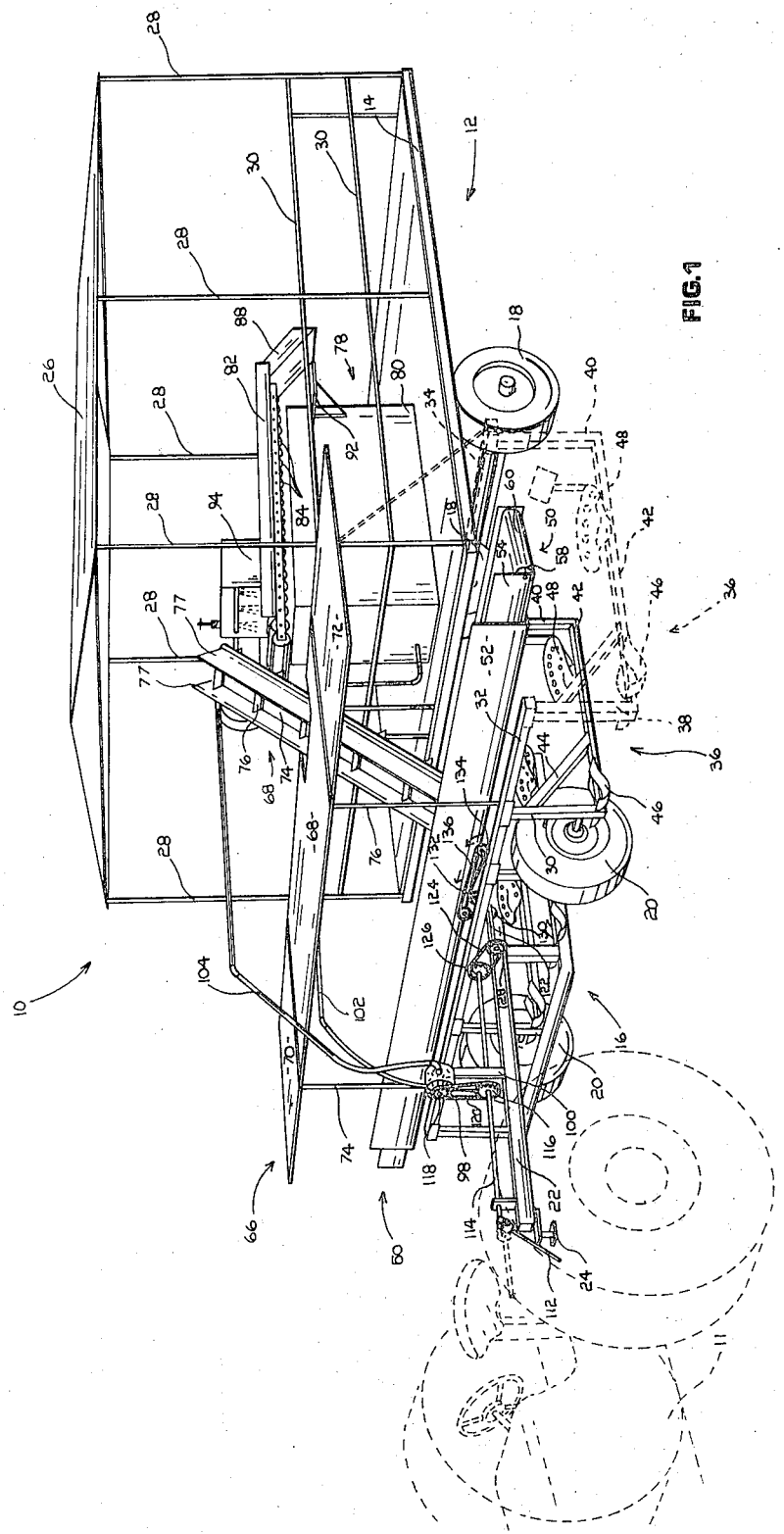
FIG. 1 is a perspective view of the fruit and vegetable harvesting device, as viewed from the front and to one side.
Figure 2:
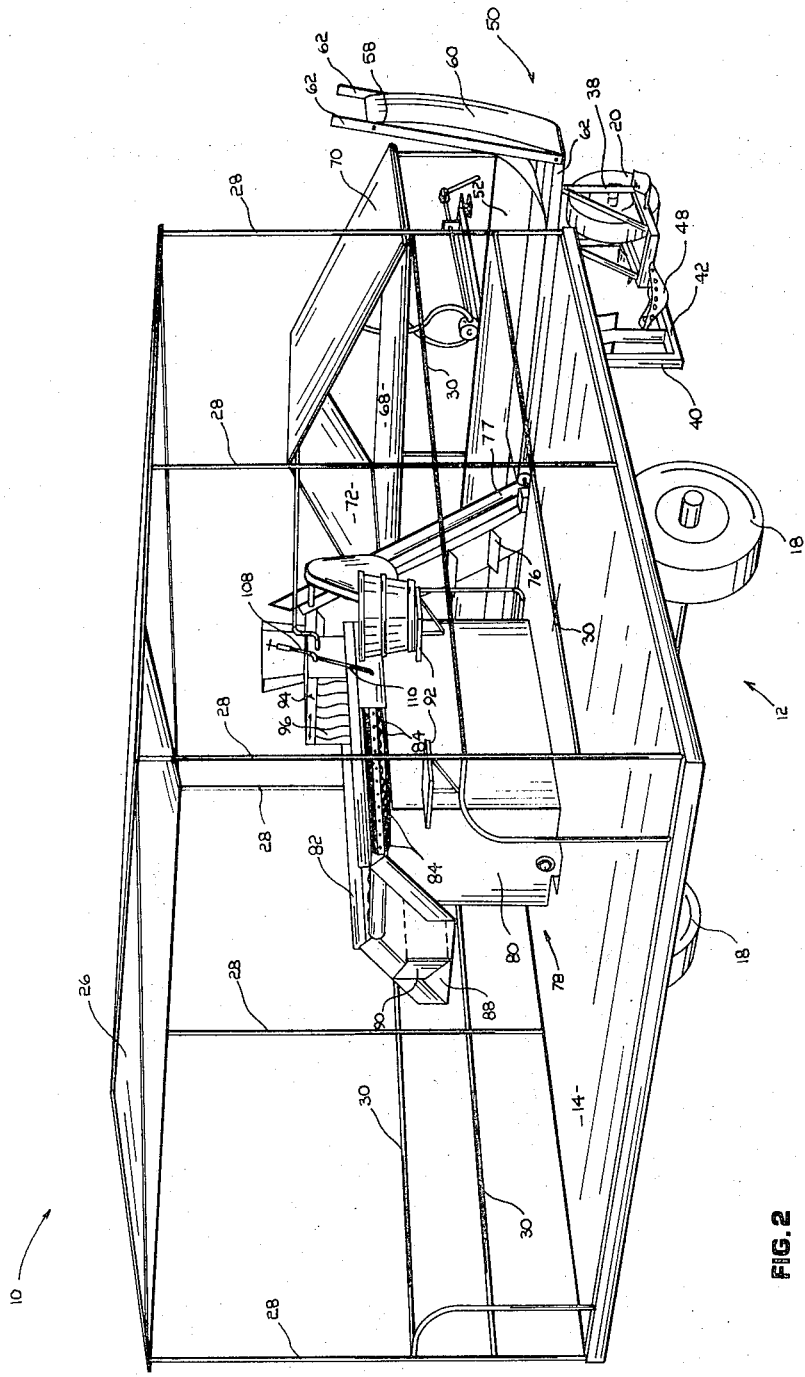
FIG. 2 is a perspective view of the fruit and vegetable harvesting device, as viewed from the rear and to one side.

With further reference to the drawings, particularly FIGS. 1 and 2, the fruit and vegetable harvester of the present invention is shown therein and indicated generally at 10. Viewing the fruit and vegetable harvester 10 in more detail, it is seen that the harvester comprises a mobile frame structure 12 which is basically comprised of a flat bed trailer 14 which has projecting from the lower forward portion thereof a subframe 16 (FIG. 1). The trailer 14 has rotatively mounted thereunder a pair of rear ground engaging wheels 18, and the lower front subframe 16 also has depending therefrom front ground engaging wheels 20.

Projecting forwardly from the lower center subframe 16 is a tongue 22 which includes a front mounted clevis 24, the clevis being provided in order to allow the fruit and vegetable harvester 10 to be coupled to the draw bar of a tractor 11 whereby the entire harvesting unit may be pulled through a field.

The trailer portion 14 includes a plurality of vertical roof support posts 28 fixed about the border thereof and extending upwardly therefrom where the upper portion of each post serves to support a canopy or roof structure 26 for sheltering the workers on the harvester. Also, the trailer or harvester includes a pair of side framing rods 30 that generally wind around the lower side and front portions thereof and are supported in spaced apart relationship by the vertical roof support post 28.

Turning to the front portion of the fruit and vegetable harvester 10, it is seen that a plurality of picking stations are disposed laterally there across for supporting individual workers. With particular reference to the structure of the picking stations, it is seen that a transverse seat support beam 32 extends above the subframe 16 and is supported thereby. Projecting outwardly from each of the front corners of the trailer 14 is a cantilever rear seat support beam 34, the cantilever rear support beam being spaced rearwardly of the front support beam 32 and disposed in general parallel relationship thereto.

Adjustably supported by the transverse support beams 32 and 34 is a seat support unit indicated generally at 36, the seat support unit being laterally adjustable on the seat support beams 32 and 34 in order to accommodate various row crop spacings and to generally enable the seat support units to be positioned where the individual worker can function most efficiently.

As can be seen from the drawings, the present fruit and vegetable harvester 10 is adaptable to support a plurality of seat units 36 on either side thereof. With particular reference to the structure of each seat unit 36, it is seen that each unit includes front and rear vertical supports 38 and 40, respectively, joined about their lower ends by a horizontal seat support 42. To strengthen the seat unit 36, a diagonal brace 44 is positioned between the front vertical support 38 and the horizontal seat support 42. The seat unit 36 is further provided with a seat structure 48 positioned intermediately on the horizontal seat support 42. Spaced forwardly of the seat structure 48 and disposed on each side of the horizontal seat support beam 42 is a foot rest 46. It, therefore, follows that each of the seat units 36 forms a picking station wherein a worker is seated thereat in close proximity to the ground and as the harvester 10 is pulled through the field, the worker is positioned such that he can manually pick the fruit or vegetables passing thereby.

Spaced above the seat units 36 and just forwardly of the seat structure 48 thereof is a transverse consolidating conveyor system, indicated generally at 50. The transverse consolidating conveyor system passes in front of each worker and functions to receive the picked fruit or vegetables from the worker and convey the same inwardly to a consolidating area 64 (FIG. 3).

Figure 4:
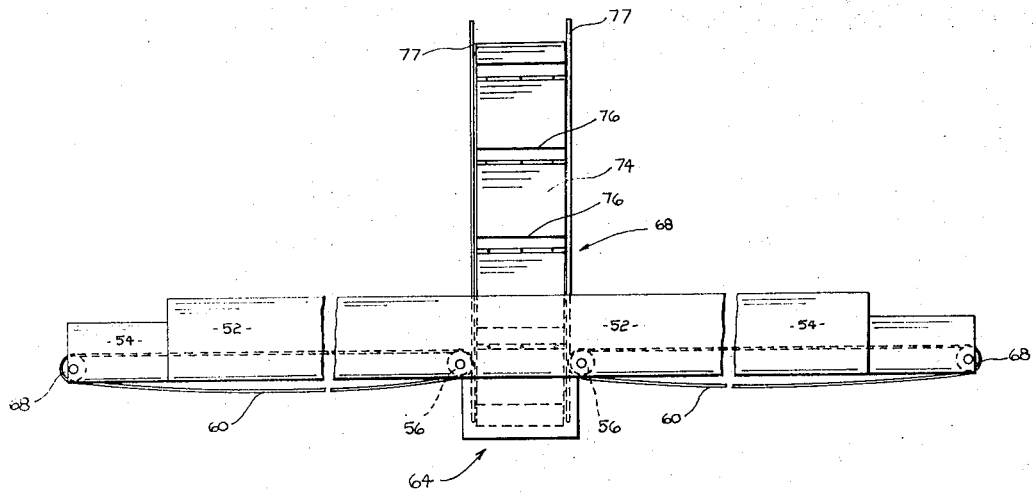
FIG. 4 is a fragmentary front elevational view of the transverse consolidating conveyor system of the harvesting device.

Viewing the transverse consolidating conveyor system 50 in detail, it will be observed from the drawings, particularly FIG. 4, that the conveyor system includes two separate conveyors, one conveyor disposed on each side of the harvester 10. The two conveyors together function to convey the picked fruit or vegetables inwardly to the consolidating area 64. More particularly, in terms of structure, the transverse consolidating system 50 is supported within a front exterior panel 52 which is supported by the subframe 16, and by an innerside panel 54 which is secured to the front exterior panel 52 and is disposed rearwardly thereof. As best illustrated in FIG. 4, each of the two conveyors forming the transverse consolidating conveyor system 50 comprises an outer and inner roller 56 and 58, respectively. Trained around the two rollers 56 and 58 is a flexible endless conveyor belt 60. It is noted from FIG. 2 that the rollers 56 and 58 of the conveyor systems are rotatively mounted within a pair of spaced apart guide rails 62. It is further seen that the guide rails 62 are pivotably mounted inwardly of their outer ends whereby the outer portions of the transverse consolidating conveyor system 50 may be pivoted upwardly to a folded position thereby reducing the effective width of the harvester 10 and providing for convenient and safe transporting thereof.

The harvester 10 is further provided with a front foldable roof structure, indicated generally at 66, which is disposed transversely above the seat units 36. The foldable front roof structure 66 comprises a central panel 68 flanked on the sides thereof by outer folding panels 70 and 72, the outer folding panels being hingedly connected about an inner edge to the outer edges of the central panel 68. Extending between the subframe 16 and the foldable front roof structure 66 is a pair of laterally spaced, upright roof supports 74 and 76. As best seen in FIG. 2, the outer folding panels 70 and 72 are swingable up and generally over the central roof panel 68, thereby reducing the effective width of the harvester and facilitating transport thereof.

Figure 3:
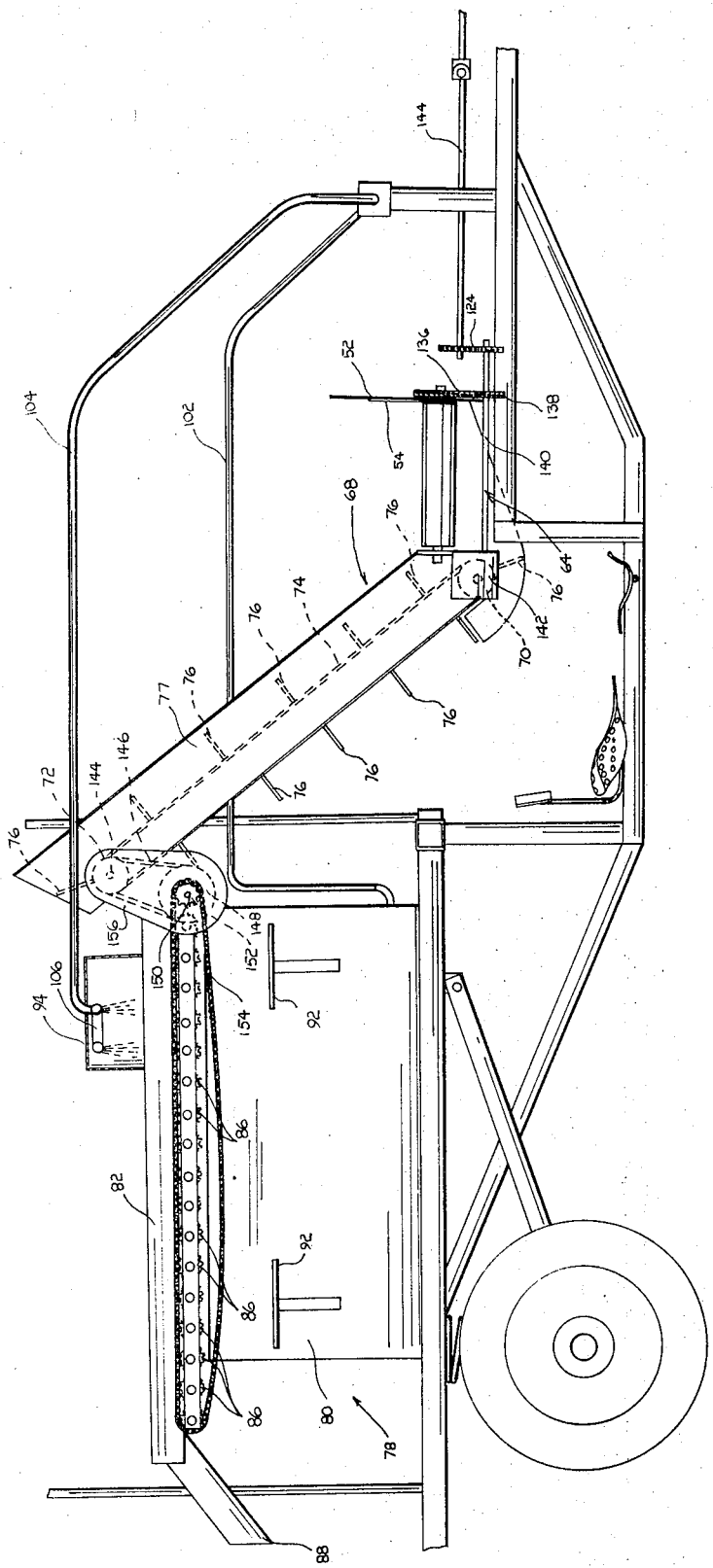
FIG. 3 is a side fragmentary sectional view of the fruit and vegetable harvesting device particularly illustrating the unitized washing and grading facility along with the associated conveyor systems of the harvesting device.

As previously pointed out, the transverse consolidating conveyor system 50 includes a pair of conveyors, each conveyor being disposed to one side of the harvester 10 and particularly adapted to convey the fruit or vegetables to an inwardly disposed accummulating area 64 as best seen in FIGS. 3 and 4.

Leading from the accummulating area 64 and upwardly therefrom is a rearwardly inclined slat conveyor 68 which basically comprises a pair of rollers, lower roller 70 and upper roller 72, and a flexible endless conveyor belt 74 trained around each of the rollers. The belt 74 is provided with a plurality of spaced apart transverse slats 76 which engage and retain the picked fruit or vegetables disposed in the accumulating area 64. The fruit or vegetables being conveyed by the rearwardly inclined slat conveyor 68 are confined thereon and prevented from moving laterally therefrom by a pair of side panels 77 which extend along each side thereof adjacent the upper segment of belt 74.

Disposed rearwardly and just below the upper end of the conveyors 68 is a unitary washing and grading facility, indicated generally at 78. The unitary washing and grading facility 78 generally comprises a reservoir 80 which is adapted to contain a cleaning solution utilized by the washing facility which will be described in greater detail hereafter. Mounted above the reservoir 80 is a roller frame structure 82 which is provided with means, such as pillow block bearings, for rotatively mounting a series of grading rollers 84 therein. The grading rollers are each rotatively mounted within the roller frame structure 82 and are generally disposed such that the upper surfaces thereof lie in substantially the same horizontal plane, and wherein the axes of rotation of each lies perpendicular to the direction of travel of the harvester. Also, as will be discussed subsequently in greater detail, the grading rollers 84 are driven such that the picked fruit or vegetables passing thereover move gently and orderly with a turning motion to expose all sides thereof. To accommodate the driving of the grading rollers 84 each of the rollers is provided about either end with a drive sprocket 86.

Extending rearwardly and inclined slightly downwardly from the rear portion of the roller frame structure 82 is an exiting chute 88 which includes a swivel divider panel 90, as best seen in FIG. 2. The swivel divider panel 90 may be moved alternatively from either side of the chute 88 to direct fruit or vegetables passing therethrough into either of two baskets, or containers, disposed below the end of such chute.

Extending outwardly from reservoir 80 on each side thereof are additional container supports 92. These additional supports 92 are used to support baskets which receive the fruit or vegetables graded and culled from those passing over the grading rollers 84.

Transversely disposed above a front portion of the roller frame structure 82 and generally overlieing a series of grading rollers 84 is a washing stall 94. The washing stall is provided with a front and rear flexible curtain 96 that generally depends downwardly therefrom into the path of fruit or vegetables being conveyed rearwardly on the grading rollers 84. Although not particularly shown, the reservoir 80 is open at the top to allow the cleaning solution being sprayed within the washing stall 96 to pass through the rollers 84 into the reservoir where the same cleaning solution may be recycled time after time.

Cleaning solution is pumped to the washing stall 94 by a pump 98 which is mounted on a pump support 100 that is fixed to and extends upwardly from tongue 22. The pump is operative to pump cleaning solution from the reservoir 80 thereto via line 102, and to pump the fluid from the pump to the washing stall 94 through line 104. Extending from line 104 through the washing stall 94 is a U-shaped pipe section 106 (FIG. 3). The U-shaped pipe 106 disposed in the washing stall 94 preferably includes a series of randomly spaced perforations or openings therein such that solution passing therethrough under pressure will be dispensed through the random openings down onto the underpassing fruit or vegetables thereby tending to clean and wash the same. Connected to the exiting end of the U-shaped pipe or tube 106 is a manually controlled pressure valve 108 for varying the pressure therein. Leading from the pressure control valve 108 is a return line 110 which leads from the pressure valve to reservoir 80.

Turning now to the harvester drive system, it will be seen that a coupling shaft 112 is disposed about the front portion of the tongue 22 and is adapted to be connected to the power takeoff of a tractor (not shown). The driving torque of the tractor is transmitted to the coupling shaft 112 which in turn is drivingly connected to a main drive shaft 114 which extends along the upper portion of the tongue 22. The drive shaft 114 is provided with an intermediate drive sprocket 116 which is operative to drive pump sprocket 118 via a drive chain 120, as best seen in FIG. 1.

The driving torque of main drive shaft 114 is transferred to jack shaft 122 by a chain-sprocket drive which comprises a drive sprocket 126 fixed to the rear end of a main drive shaft 114 and a driven sprocket 128 fixed to the front end of jack shaft 122. Sprockets 126 and 128 are drivingly interconnected by a conventional chain 124.

Jack shaft 122 is further provided with an end drive sprocket 130 which is operative to drive sprockets 132 and 134 by a chain 136. At this point, it should be pointed out that sprockets 132 and 134 are operatively connected to the inner most rollers 58 of the transverse consolidated conveyor system 50. With particular reference to FIG. 1, it is seen that by driving chain 136 in the direction of the arrow shown thereabove and by particularly threading the chain 136 such that it passes over sprocket 132 and down and around the sprocket 134 results in the two inner rollers 58 of the transverse consolidated conveying system being driven counter to each other consequently resulting in both conveyors of the system being operative to direct fruit or vegetables placed thereon toward the center of the harvester 10.

Also engaged with drive chain 136 is a secondary drive sprocket 138 which is fixed to a longitudinal extending secondary drive shaft 140. Secondary drive shaft 140 has its rear most end drivingly connected to a right angle gear box 142 which is in turn drivingly connected to the lower roller 70 of the incline conveyor 68. Therefore, the torque of the main drive shaft 114 is first transferred to jack shaft 122 and then to secondary drive shaft 140 where the torque thereof is transmitted through the right angle gear box 104 to the lower roller 70 which in turn drives the incline conveyor 68.

Referring particularly to FIG. 3, it is seen that the upper roller of the incline conveyor 68 is provided with a drive procket 144. The rotative motion of the drive sprocket 144 is transferred to a lower spaced driven sprocket 148, which is fixed to transverse shaft 150, by a drive chain 146. Transverse shaft 150 also includes a drive sprocket 152 which is drivingly connected to each grading roller drive sprocket 86 by a chain 154. As shown by the drawings, the final drive from the inclined conveyor system 68 to the grading rollers 84 is provided with a drive housing 156 which tends to shield that particular drive from the individual workers who may be standing on the trailer 14 adjacent the unitary washing and grading facility 78.

In operation, the fruit and vegetable harvester 10 is typically coupled to a tractor 11 and towed through the field of fruit or vegetables. Once the harvesting operation is ready to commence, the tractor operator engages the power takeoff thereof and by the drive system just described, the driving torque of the power takeoff is supplied to the following harvesting unit so as to drive the transverse consolidated conveyor system 50, the rearwardly inclined conveyor 68, and the unitary washing and grading facility 78 including the pump 98. As the trailer transverses the field, workers positioned on the seat structure 48 pick and remove fruit or vegetables from the plants of the under passing crop. The workers then place the fruit or vegetables on the conveyor belt 60 spaced just forwardly and above them where the fruit or vegetables are conveyed inwardly to an accummulating area 64. The slats 76 of the conveyor 68 sweep through the accummulating area 64 and engage and retain the fruit or vegetables therein. From the accummulating area 64, the rearwardly inclined conveyor 68 transfers the fruit or vegetables upwardly therefrom where they drop from the upper portion onto the driven grading rollers 84.

Once disposed on the front grading rollers 84, the picked fruit or vegetables then enter the washing stall 94 where cleaning solution from the U-shaped tube 106 is sprayed downwardly thereon. The spraying of the fruits or vegetables tends to wash and clean the same and once they have passed through the washing stall 94, they then enter the grading area. Stationed about the grading area are a suitable number of workers who cull and grade the passing fruit or vegetables. The culled or graded portion of the picked crop is placed in containers stationed on the supports 92, while that portion of the picked crop falling within the range of the most typical grade is allowed to pass therethrough where the picked fruit or vegetables slide down the exiting chute 88 into a basket or container placed thereunder.

Although a tractor unit has been described as powering the combination harvester and grader of the present invention, it is obvious that a self propelled version could be developed to accomplish the same results.

From the foregoing, it is obvious that the fruit and vegetable harvester 10 of the present invention is designed to provide an economical and efficient system for not only harvesting small fruit or vegetables but also providing within the same unit a facility to wash, clean and grade the harvested crop. Also, the present harvesting device has the advantage of being readily adaptable to a conventional farm tractor and is accordingly provided with a drive train or system that is readily adaptable thereto whereby the power from the tractor power takeoff may be conveniently and efficiently used to power the various components of the complete harvesting unit.

The terms "upper," "lower," "forward," "rearward," etc., have been used herein merely for convenience of the foregoing specification and in the appended claims to describe the fruit and vegetable harvesting device and its parts as oriented in the drawings. It is to be understood, however, that these terms are in no way limiting to the invention since the fruit and vegetable harvesting device may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A fruit and vegetable crop harvesting device comprising: a mobile frame structure; a plurality of laterally spaced transversely aligned picking stations disposed transversely of said mobile frame structure, each picking station adapted to support an individual worker thereon such that said worker may pick the fruit or vegetable crop lying therebeneath as the harvesting device traverses a field, said picking stations comprising, rigid beam means extending outwardly on both sides of said frame structure, a plurality of vertical support means fixed to said rigid beam means and depending downwardly therefrom, a single piece longitudinal seat support bar fixed to respective vertical support means and supported thereby, and seat means fixed to each single piece horizontal seat support bar for supporting the individual worker thereon; a transverse consolidating conveyor system disposed adjacent and in close proximity to said picking stations and adapted to receive and convey the fruit or vegetables picked by the individual workers stationed on the picking stations; a washing facility disposed on said mobile frame structure for washing and cleaning the picked fruit or vegetables, said washing facility including liquid applying cleaning means for cleaning the harvested crop passing thereby; conveyor means operatively interconnected between said transverse consolidating conveyor system and said washing facility for conveying the picked fruit or vegetables to said washing facility; and a grading system disposed on said mobile frame structure and adapted to receive picked fruit or vegetables from said washing facility, whereby said washed fruit or vegetables may be graded and separated accordingly.

2. The fruit and vegetable crop harvesting device of claim 1 wherein said washing facility and said grading station form a unitary structure.

3. The fruit and vegetable crop harvesting device of claim 2 wherein said unitary washing facility and grading station comprises: a reservoir disposed on said main frame structure for containing a cleaning solution; a series of grading rollers rotatively mounted above said reservoir; and a washing stall situated above said reservoir and disposed generally between said grading rollers and said conveyor means whereby picked fruit or vegetables enter the washing stall prior to being graded.

4. The fruit and vegetable crop harvesting device of claim 3 wherein said mobile frame structure is adapted to be pulled behind a tractor having a power takeoff, and wherein said washing facility further comprises: a pump secured on said mobile frame structure; drive means interconnecting said pump with the power takeoff of said tractor whereby driving torque generated by the tractor is transferred to the pump; and pipe means interconnecting said pump, reservoir, and washing stall for delivering the cleaning solution, contained in said reservoir, under pressure to said washing stall for cleaning the picked fruit or vegetables passing therethrough.

5. The fruit and vegetable crop harvesting device of claim 4 wherein said pipe means includes a generally U-shaped pipe structure disposed interiorly of said washing stall and provided with randomly arranged perforations therein whereby the cleaning solution passing therethrough under pressure may be dispensed through said performation onto the underpassing fruit or vegetables.

6. The fruit and vegetable crop harvesting device of claim 1 wherein said transverse consolidating conveyor system comprises two laterally spaced conveyors, each conveyor being disposed on a respective side of said mobile frame structure and oriented so as to convey the fruit or vegetables thereon inwardly to a consolidating area.

7. The fruit and vegetable crop harvesting device of claim 6 wherein said conveyor means extending between said transverse consolidating conveyor system and said washing facility includes rearwardly inclined slat conveyor for conveying the consolidated fruits or vegetables from said consolidating area to said washing facility.

8. The fruit and vegetable crop harvesting device of claim 1 wherein said grading station includes, about the rear thereof, an exiting chute for directing the fruit or vegetables passing thereover into a container, said exiting chute including a pivotably mounted divider panel for directing the fruit or vegetables passing over the grading station into one side of the exiting chute whereby the movement of said divider panel from one side of the chute to the other results in the passing fruit or vegetables being directed into separate containers resting below said exiting chute.

9. The fruit and vegetable harvesting device of claim 8 wherein said grading station further includes a plurality of supporting racks for supporting containers therearound whereby the fruit or vegetables culled or graded from those fruit or vegetables passing across the grading station may be placed in the containers supported about the sides of the grading stations by said supporting racks.

10. The fruit and vegetable harvesting device of claim 9 wherein said rigid beam means comprises a pair of longitudinally spaced apart parallel beams that extend across said frame structure forwardly of said grading station, said parallel beams extending along front and back sides of said consolidating conveyor system for supporting said longitudinal seat support bars of each picking station in close proximity to said consolidating conveyor system.

11. The fruit and vegetable harvesting device of claim 10 including a multi-paneled top structure having a hingedly mounted top panel disposed on opposite ends thereof such that the hinged end panels may be folded inwardly to decrease the effective grip of the harvesting device.

* * * * *